United States Patent [19]
Quesnel et al.

[11] 3,906,116
[45] Sept. 16, 1975

[54] CONCENTRATED OLEORESIN PRODUCTS AND EMULSIFICATION PROCESS FOR PREPARING THEM

[75] Inventors: Peter Gregory Quesnel, London; Andreas Lambrou, Kelvedon; Edwin Stanley Walker, Romford, all of England

[73] Assignee: Bush Boake Allen Ltd., London, England

[22] Filed: Sept. 24, 1973

[21] Appl. No.: 400,169

[30] Foreign Application Priority Data
Sept. 25, 1972 United Kingdom............... 44220/72

[52] U.S. Cl. ............... 426/602; 426/98; 426/651; 426/654; 426/655; 426/658; 426/534
[51] Int. Cl.² ......................................... A23L 1/26
[58] Field of Search ....... 426/89, 98, 221, 223, 471, 426/342, 362, 369, 202, 222, 194, 363, 201; 264/4; 424/168, 186

[56] References Cited
UNITED STATES PATENTS
1,545,993  7/1925  Alsberg.............................. 426/221
3,091,567  5/1963  Wurzburg et al................. 426/98 X
3,582,361  6/1971  Huth..................................... 426/98
3,819,838  6/1974  Smith et al....................... 426/223 X Primary Examiner—A. Louis Monacell
Assistant Examiner—Esther L. Massung
Attorney, Agent, or Firm—Flynn & Frishauf

[57] ABSTRACT

Concentrated emulsions of flavor oleoresins are prepared by (1) forming a solution or colloidal solution of the oleoresin in a diluent; (2) forming a preformed mixture comprising an emulsion stabilizer and at least one oil selected from the group consisting of edible and essential oils; (3) mixing said solution or colloidal solution with said preformed mixture with agitation; (4) adding an aqueous solution or dispersion of an emulsion stabilizer to form a final mixture; and (5) emulsifying said final mixture. The product aqueous emulsion may be spray dried to form an encapsulated oleoresin.

22 Claims, No Drawings

CONCENTRATED OLEORESIN PRODUCTS AND EMULSIFICATION PROCESS FOR PREPARING THEM

The present invention relates to compositions for use in the flavouring industry. In particular it relates to the production of stable emulsions of oleoresins, and microencapsulated products obtained therefrom.

Hitherto, although stable emulsions, suitable for example for use in the production of micro encapsulated flavours, have been preparable for many oleoresins, for some, such as pepper, and turmeric it has not been possible to prepare them stable at a sufficient loading of oleoresin to be useful and for others such as ginger, cinnamon and mushroom substantial difficulties have been encountered in the preparation of a stable emulsion at the required concentration. Such prior attempts have employed standard emulsification techniques to prepare emulsions of these oleoresins and have normally involved first dispersing a stabiliser with or without an emulsifying agent in water then adding the oleoresin optionally with a diluent e.g. a vegetable oil and then emulsifying the mixture obtained. Sometimes the oleoresin has to be heated with diluent to achieve dispersion of the resin and then polymerization and/or caramelization of the oleoresin particularly for cinnamon can occur also hindering the production of suitable stable emulsions.

We have now found that we can prepare satisfactory emulsions of oleoresins in water if we dilute the oleoresin with diluent first, then mix with a mixture of oil and stabilizer and mix the product with stabilizer in water before emulsification.

The present invention provides a process for preparing an emulsion of a flavour oleoresin which process comprises in step (*a*) forming a solution or colloidal solution of the oleoresin in a diluent, in step (*b*) mixing the solution or colloidal solution with agitation with a preformed mixture comprising an emulsion stabilizer, and at least one of an edible and essential oil optionally with an emulsifier, in step (*c*) adding an aqueous solution or dispersion of an emulsion stabilizer to form a final mixture, and in step (*d*) emulsifying the final mixture.

In a further aspect the invention provides an aqueous emulsion comprising at least 8% by weight of at least one of pepper cinnamon, ginger, mushroom and turmeric oleoresins (based on the weight of non-aqueous components of the emulsion) and an emulsion stabilizer, diluent, at least one of an edible and essential oil and water.

In this specification, the diluent to be mixed with the oleoresin is defined as at least one organic liquid, capable of forming a solution of colloidal solution with the oleoresin, and is preferably not an edible oil or essential oil. The organic liquid is usually aliphatic with not more than 9 carbon atoms. Where the emulsion produced by the process of the invention is used as such in foods, the diluent and its amount must comply with any relevant food regulations. Where the emulsion is converted into another product e.g. a microencapsulated flavour product before addition to food, the diluent must be such that in the amount present in that other product it complies with any food regulations. Thus where the diluent is volatile, substantial amounts, if not all of it, will be removed from the emulsion during spraydrying. Hence diluents which are not acceptable in the amounts present in the emulsions may in some cases be acceptable for use in the process when the emulsion is subsequently spraydried.

Examples of the diluents are mono or polyhydric alcohols of two to six carbon atoms, e.g. ethanol, isopropanol, propylene glycol, and glycerol, and esters thereof with alkanoic acids of two to 18 carbon atoms such as acetic and myristic acids, the esters being e.g. ethyl acetate, isopropyl myristate or triacetin. Propylene glycol is the preferred diluent for turmeric oleoresin.

Flavour oleoresins are compounds obtained from an appropriate plant material and extractable therefrom by solvent extraction, and subsequent removal of the solvent. The cleoresin contains the nonvolatile components of the extract and all or some of the volatile components of the extract. Suitable oleoresins for use in this invention are those of herbs and spices and include for example those of pepper, cinnamon and turmeric as well as mushroom and ginger. The oleoresin may be used as it is or mixed with one or more other oleoresins. Thus to make a curry flavouring material, the following oleoresins and oils may be used, capsicum, coriander, cumin, fenugreek, ginger, pepper and turmeric oleoresins and garlic oil and onion oil, with the turmeric oleoresin being a major component. The oleoresin or the mixtures containing it can be used in their "standardized" form, that is diluted to a standard concentration with e.g. vegetable oils such as cotton seed oil or alcohols such as propylene glycol.

In step (*a*) of the process the diluent and oleoresin are mixed. If the oleoresin is not liquid at room temperature but will liquefy on warming, it is warmed until it liquefies and is then mixed with the diluent. In the cases of oleoresins such as some of those of cinnamon, which are solid at less than 100°C, the diluent is first added and the mass then warmed with stirring to produce a colloidal solution; care must be taken with cinnamon oleoresin not to heat it too high or polymerization will occur and preferably the oleoresin is finely divided to aid the production of the colloidal solution. The amount of diluent employed will depend upon its nature but will normally be from 25 to 120% by weight, based on the weight of the oleoresin, for example from 33 to 66% by weight if propylene glycol is used and from 30 to 100% if ethanol is used.

The mixture of oleoresin and diluent is then admixed with continuous vigorous agitation (e.g. stirring) with a preformed mixture of stabiliser with or without emulsifying agents and edible and/or essential oil. Normally the oleoresin/diluent mixture is mixed with the stabilizer/oil mixture in a weight ratio of from 2:1 to 4:1, preferably 2.5 to 3.5:1.

Suitable stabilisers for use in the present invention are those which increase the viscosity of the continuous aqueous phase of the final emulsion and are normally polymers which form solutions or colloidal solutions or gels in water. Examples are natural or modified gum, such as gum acacia, a natural or modified starch, such as dextrinised starch e.g. from potatoes, maize or tapioca, a dextrin or maltodextrin, a pectin, an alginate, or a proteinacious material such as gelatin or casein, which is natural or modified. As with the diluent the stabiliser employed should comply with the relevant food regulations. When the emulsion produced is to be used to form a microencapsulated flavour product the polymeric stabilizer usually also provides the encapsulant. Alternatively to polymeric stabilizers can be used non polymeric emulsion stabilizers such as fatty acid partial esters of sorbitol anhydride or sorbitan (e.g. those known by the trade name "Span") and polyoxyethylene derivatives of fatty acid partial esters of sorbitol anhydride (e.g. those known by the trade name Tween). The non polymeric stabilizers cannot be used also as an encapsulant in microencapsulated products produced from the emulsions of the invention.

Suitable emulsifying agents which may be employed if desired include for example, lecithin, pectins, glycerol fatty acid esters, milk whey, polysorbates, poly oxyethylene derivatives of sorbitan esters of fatty acids, and mono- and di-ethyl esters of di- and tri-carboxylic acids of two to six carbon atoms. These again must comply with food regulations.

Suitable edible oils include vegetable oils for example, arachis oil, olive oil, palm and palm kernel oil, coconut oil fractions, corn oil, cotton seed oil, sesame seed oil, safflower oil, sunflower oil and soya been oil. Other edible oils are animal oils, for example deodorized fish oil and whale oil. The edible oil can be partially or completely replaced by an essential oil, for example pepper or turmeric oil, especially when the corresponding oleoresin is used.

Normally the preformed mixture contains stabiliser and oil in a weight ratio of from 1.5:1 to 3:1 preferably about 2:1.

Once the mixture of stabiliser and oil has been mixed with the oleoresin/diluent mixture, the mixture so formed is mixed in step (c) with an aqueous solution or dispersion containing more stabiliser. Normally this aqueous solution or dispersion contains from 10 to 65, preferably 20 to 50% by weight of stabiliser. Whatever the concentration of the aqueous solution or dispersion the weight of stabiliser contained therein will normally be in the range 2 to 6 preferably 3 to 5 times, the weight of stabiliser mixed with the oil. Thus the total weight of stabilizer to oil is usually 18:1 to 3:1.

Normally the stabiliser employed in the aqueous solution or dispersion will be the same as that used in the mixture with vegetable oil, but this is not essential, however, so long as the different stabilisers are compatible with each other. Usually one and preferably both of the stabilizers in steps (b) and (c) increases the viscosity of the aqueous phase of the final emulsion.

In step (d), the final mixture is subjected to physical emulsification by conventional techniques such as mechanical emulsification, for example in a turbine mixer, e.g. a Silverson mixer, although other mechanical means for preparing the emulsion may be employed if desired or ultrasonic emulsification can be used.

As finally formulated the emulsion will normally comprise at least 3% usually at least 8% and often up to 35%, e.g. from 20 to 30% of the oleoresin by weight based on the non-aqueous components of the emulsion. The emulsions usually contain 5 – 35% diluent, 3 – 15% especially 3 – 10% oil and 30 – 70% stabilizer, the percentages being by weight of the non-aqueous components. For pepper and turmeric oleoresins, emulsions can be obtained of 8 – 35%, especially 20 – 30%. and 8 – 25% especially 8 – 20% oleoresin respectively. For cinnamon, emulsions of at least 8% oleoresin e.g. 10 – 25 % are obtainable, for ginger emulsions of at least 8 % e.g. 20 – 50% and for mushroom, emulsions of at least 8%, e.g. 20 – 40 %.

Emulsions prepared according to the invention are stable and particularly suitable for use directly as food flavouring or in the production of micro encapsulated flavouring materials by spray drying or other means.

The present invention also provides flavouring compositions comprising an emulsion of the invention mixed with one or more other flavouring agents, such as essential oils e.g. those given above.

The emulsions of the invention or the above flavouring compositions can be converted into products suitable for mixing with the food material to be flavoured. Often they are converted into microencapsulated flavouring materials e.g. by spraydrying. When the stabilizer can act as an encapsulant e.g. in the cases of the polymeric stabilizers, no extra encapsulant need be added to the emulsion, but otherwise encapsulant must be added e.g. one of the above listed polymeric stabilizers. The emulsion may be spraydried by known methods, for example by using a spraydryer-atomizer or spinning disc under conditions and with a flow rate sufficient to provide an inlet temperature of 175° – 210°C and an outlet temperature of 90° – 110°C; inlet and outlet temperatures of about 200°C and about 100°C are usual.

This invention also provides microencapsulated flavouring products which comprise at least 8% by weight of at least one of pepper and turmeric oleoresins (based on the weight of the product), an encapsulant which is also an emulsion stabilizer, and at least one of an edible and essential oil. The microencapsulated flavouring products usually have a particle size of up to 200 $\mu$, e.g. 10 – 200 $\mu$, preferably 20 – 100$\mu$, such as about 50 $\mu$. They usually comprise up to 33% diluent e.g. 0.005 – 31% (depending on the volatility of diluent and the spraydrying conditions) 3 – 22% of oil, preferably 5 – 15%, 31 – 76% encapsulant and 8 – 40% of oleoresin, the percentages being by weight of product, apart from residual moisture the amount of which depends on the nature of the stabilizer and the spray drying conditions, but is usually up to 8% e.g. 6–8% for gum acacia and 3 – 5% for maltodextrin. The weight ratio of encapsulant to oil is usually 24:1 to 2.2:1. The emulsions, flavouring compositions or products obtained therefrom e.g. microencapsulated flavouring product can be used to flavour a wide variety of foods such as soups, sauces, processes meat products, pickles and vinegars with the emulsions usually being used for the flavouring of wet foods.

The invention is illustrated by the following examples in which all parts and percentages are by weight unless otherwise stated.

EXAMPLE 1

30 parts of pepper oleoresin were heated until completely liquid, and the liquid mixed with 20 parts of propylene glycol in step (a). This mixture was then admixed in step (b) with a preformed paste of 10 parts of gum acacia and 5 parts of arachis oil. This mixture was then added with stirring in step (c) to 195 parts of a mucilage of 35 parts gum acacia in 160 parts of water and the whole formulation introduced to a Silverson turbine mixer in order to bring about the formation of a stable emulsion.

The emulsion can be used as such as a flavouring or can be spraydried at an inlet temperature of about 200°C and an outlet temperature of about 100°C using a spraydrying atomizer. The bulk of the microencapsulated product had a particle size of 20–200µ. The microcapsules consisted of 30.6% pepper oleoresin, 18.4% propylene glycol, 46% gum acacia, 5.1% arachis oil based on the weight of the product apart from residual moisture.

EXAMPLE 2

An aqueous emulsion of pepper oleoresin was prepared in the same manner as in Example 1 except that 15 parts of isopropyl alcohol were employed instead of the propylene glycol and that 200 parts of a mucilage of gum acacia comprising 40 parts gum acacia and 160 parts water were employed instead of the mucilage of Example 1. The emulsion can be used as such as a flavouring or spray dried by the process given in Example 1 to produce microcapsules of the size as in Example 1 and consisting of 34% pepper oleoresin, 3% isopropyl alcohol, 57% gum acacia, 6% arachis oil, based on the weight of the product apart from residual moisture.

EXAMPLE 3

An aqueous emulsion of pepper oleoresin in water was prepared in the same manner as in Example 1 except that 35 parts of the oleoresin were employed instead of 30 parts and 10 parts of ethanol were employed instead of the propylene glycol. A further modification was in the use of 200 parts of a mucilage of gum acacia comprising 40 parts gum acacia and 160 parts water.

The emulsion can be used as such or spraydried by the process given in Example 1 to produce microcapsules consisting of 37.5% oleoresin, 3% ethanol, 54% gum acacia and 5.4% arachis oil, based on the weight of the product apart from residual moisture.

EXAMPLE 4

An aqueous emulsion of turmeric oleoresin in water was prepared in the same manner as in Example 1 from 12.5 parts of turmeric oleoresin and 32.5 parts of propylene glycol in step (a), 10 parts of gum acacia and 5 parts of arachis oil in step (b) and 40 parts of gum acacia and 160 parts of water in step (c).

The emulsion can be used as such or spraydried by the process given in Example 1 to produce microcapsules consisting of 12.7% turmeric oleoresin, 31.2% propylene glycol, 46% gum acacia 5.1% arachis oil, based on the weight of the product apart from residual moisture.

EXAMPLE 5

A curry flavoured aqueous emulsion was prepared in the same manner as in Example 1 from 14 parts of curry blend oleoresin and 31 parts propylene glycol in step (a), 10 parts gum acacia and 5 parts arachis oil in step (b) and 40 parts gum acacia and 120 parts water in step (c). The curry blend oleoresin contained capsicum, coriander, cumin, fenugreek, ginger, pepper and turmeric oleoresins (the turmeric providing 26% of the oleoresin component), garlic oil and onion oil.

The emulsion can be used as such or spray dried as in Example 1 to form microcapsules consisting of 14.5% curry blend oleoresin, 29.5% propylene glycol, 51% gum acacia and 5% arachis oil, based on the weight of the product apart from residual moisture.

EXAMPLE 6

Example 5 was repeated but replacing the 5 parts of arachis oil by 5 parts of turmeric oil. A stable emulsion was obtained.

The emulsion can be used as such or spray dried as in Example 1 to form microcapsules consisting of 14.5% curry blend oleoresin, 29.5% propylene glycol, 51% gum acacia and 5% turmeric oil, based on the weight of the product apart from residual moisture.

EXAMPLE 7

A mushroom oleoresin aqueous emulsion was prepared in the same manner as in Example 1 from 30 parts of mushroom oleoresin, 10 parts propylene glycol in step (a), 10 parts gum acacia and 5 parts arachis oil in step (b) and 45 parts gum acacia and 120 parts of water in step (c). The stable emulsion produced can be used as such or spraydried as in Example 1 to form microcapsules consisting of 30.3% mushroom oleoresin, 9.1% propylene glycol, 55.5% gum acacia and 5.05% arachis oil, based on the weight of the product apart from residual moisture.

EXAMPLE 8

A cinnamon oleoresin aqueous emulsion was prepared in the same manner as in Example 1 from 15 parts of cinnamon oleoresin (Ceylon) and 30 parts glycerol in step (a), 10 parts gum acacia and 5 parts arachis oil in step (b) and 40 parts gum acacia and 120 parts water in step (c). The stable emulsion produced can be used as such or spray dried as in Example 1 to form microcapsules consisting of 15.3% cinnamon oleoresin, 28.6% glycerol, 51% gum acacia and 5.1% arachis oil, based on the weight of the product apart from residual moisture.

We claim:

1. A process for preparing an aqueous emulsion of a flavour oleoresin which process comprises forming, an oleoresin solution or collodial solution (a) of the oleoresin in a diluent; mixing said solution or colloidal solution (a) with agitation with a preformed mixture (b) comprising an emulsion stabiliser, and at least one oil selected from the group consisting of edible oils and essential oils; adding an aqueous solution or dispersion (c), of an emulsion stabiliser to form a final mixture (d), and emulsifying said final mixture (d) to form an aqueous emulsion of said flavor oleoresin.

2. A process according to claim 1 wherein the oleoresin is at least one oleoresin selected from the group consisting of pepper, turmeric, cinnamon and mushroom oleoresins.

3. A process according to claim 2 wherein there is obtained an emulsion containing at least 20% by weight of pepper oleoresin (based on the weight of the non-aqueous components of the emulsion).

4. A process according to claim 1 wherein the diluent is ethanol, isopropanol, or propylene glycol.

5. A process according to claim 1 wherein the weight of diluent in said solution (a) is 25 – 120% of the weight of oleoresin.

6. A process according to claim 1 wherein 2 – 4 parts by weight of solution or colloidal solution (a) are mixed with 1 part by weight of the mixture (b).

7. A process according to claim 1 wherein the preformed mixture (b) contains emulsion stabilizer and oil in a weight ratio of 1.5:1 to 3:1

8. A process according to claim 1 wherein the weight of stabiliser in the aqueous solution or dispersion (c) is two to six times the weight of stabilizer in the preformed mixture (b).

9. A process according to claim 1 wherein an emulsifying agent is added during said mixing of solution (a) with the preformed mixture (b).

10. A process according to claim 1 wherein the stabilizer is at least one stabilizer selected from the group consisting of gum acacia and maltodextrin.

11. A process according to claim 1 wherein the edible oil is arachis oil or cotton seed oil.

12. A process according to claim 3 wherein said emulsion stabilizer is at least one stabilizer selected from the group consisting of gum acacia and maltodextrin, and wherein said oil is arachis oil or cotton seed oil.

13. A process according to claim 1 wherein there is obtained an emulsion containing at least 8% of oleoresin based on the weight of the non-aqueous components.

14. A process according to claim 2 wherein there is obtained an emulsion containing at least 8% of oleoresin based on the weight of the non-aqueous components.

15. A process according to claim 14 wherein the weight of diluent is 25–120% of the weight of oleoresin; wherein the preformed mixture (b) contains emulsion stabilizer and oil in a weight ratio of 1.5:1 to 3:1, wherein 2–4 parts by weight of solution or colloidal solution (a) are mixed with 1 part by weight of the preformed mixture (b); and wherein the weight of stabilizer in the aqueous solution or dispersion (c) is two to six times the weight of the stabilizer in the preformed mixture (b).

16. A process according to claim 15 wherein the diluent is ethanol.

17. A process according to claim 15 wherein the diluent is propylene glycol.

18. A process according to claim 15 wherein an emulsifying agent is added during said mixing of solution (a) with the preformed mixture (b).

19. A process according to claim 15 wherein the stabilizer is at least one stabilizer selected from the group consisting of gum acacia and maltodextrin.

20. A process according to claim 15 wherein said preformed mixture (b) comprises an emulsion stabilizer and arachis oil.

21. A process according to claim 15 wherein said preformed mixture (b) comprises an emulsion stabilizer and cotton seed oil.

22. A process according to claim 3 wherein said emulsion contains between 20 and 35% pepper oleoresin; wherein said diluent is ethanol or propylene glycol; wherein the weight of said diluent in said solution is 25–120% of the weight of the oleoresin; wherein the preformed mixture (b) contains emulsion stabilizer and oil in a weight ratio of 1.5:1 to 3:1; wherein the weight of stabilizer in the aqueous solution or dispersion (c) is two to six times the weight of stabilizer in the preformed mixture (b); wherein 2–4 parts by weight of solution or colloidal solution (a) are mixed with 1 part by weight of the mixture (d); wherein an emulsifying agent is added during said mixing of solution (a) with the preformed mixture (d); wherein the stabilizer is at least one stabilizer selected from the group consisting of gum acacia and maltodextrin; and wherein the said preformed mixture (b) comprises an emulsion stabilizer and arachis oil or cotton seed oil.

* * * * *